Figure 1:
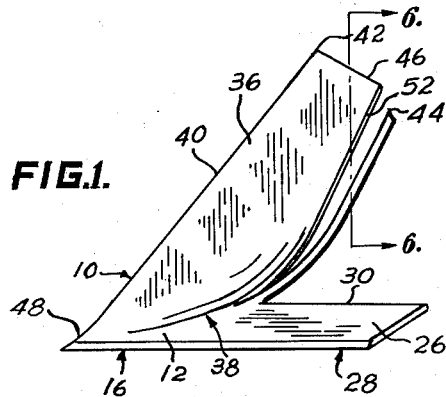

July 18, 1961 F. M. RABUSE 2,992,690
CULTIVATOR IMPLEMENT
Filed June 30, 1958

INVENTOR.
Frank M. Rabuse
BY
ATTORNEY.

United States Patent Office 2,992,690
Patented July 18, 1961

2,992,690
CULTIVATOR IMPLEMENT
Frank M. Rabuse, Hillsdale, Kans. (Rte. 3, Paola, Kans.)
Filed June 30, 1958, Ser. No. 745,470
3 Claims. (Cl. 172—770)

This invention relates to a cultivator implement and more particularly, to an improved, modified sweep adapted to be mounted on a mobile vehicle for cultivating soil surrounding row crops in order to destroy weeds and loosen such soil.

Various types of cultivator implements have heretofore been suggested but the blades have not been completely satisfactory because proper loosening of the soil and cutting off of weeds below the surface of the ground was not accomplished without undue covering up of the row crops during cultivation with the blades, by virtue of the dirt being thrown directly onto the plants. One prior solution to this problem was the provision of fender elements disposed on the mounting frame of the cultivator and adapted to receive the plants therebetween to protect the same during such cultivation, but these fenders were unsatisfactory because they tended to clog up with trash and weeds and were necessarily located a sufficient distance above the actual surface of the ground to compensate for irregularities in such surface, so that throwing of dirt onto the plants was not effectively prevented. Another, more satisfactory answer to the problem presented was the provision of a cultivator implement in the nature of a modified sweep provided with a substantially upright baffle plate secured to the main blade of the implement and to the laterally extending mounting shank of the same to prevent dirt being thrown onto the plants during use of the implement. This improved sweep is illustrated in my copending application Serial No. 726,270, filed April 3, 1958, entitled "Cultivator Implement," of which the present application is a continuation-in-part.

The cultivator implement of my prior application was particularly advantageous in the cultivation of row crops in relatively dry soil but it was determined improved results could be obtained in moist, gumbo type ground by modifying the cultivator blade in certain respects.

It is therefore the most important object of the present invention to provide a cultivator implement which is adapted to be used in pairs, one being a mirror image of the other, and comprising a modified sweep which effectively loosens the soil surrounding row crops and cuts weeds below the surface of the ground without throwing such loose dirt onto the plants during advancement of the sweep, and constructed in a novel manner to make the same equally useful in relatively dry or sandy soil as well as in moist, somewhat sticky ground.

An equally important object of the present invention is to provide a modified sweep cultivator implement as referred to, wherein is provided a slot between the upright baffle plate and the mounting shank of the implement to thereby clear loose dirt deposited against the shank during forward advancement of the implement.

Other important objects of the invention relate to the provision of a modified cultivator implement wherein the lowermost margin of the baffle plate disposed in spaced relationship to the proximal, longitudinally extending edge of the shank and defining the slot therebetween is complementally configured with the longitudinal edge of the shank to thereby assure smooth flow of dirt from the shank during advancement of the implement; and to the provision of a modified sweep cultivator implement wherein the loose dirt-clearing slot defined between the upright plate and the mounting shank is somewhat wider at the uppermost end thereof to more efficiently clear dirt deposited against the shank during use of the sweep.

Figure 2:
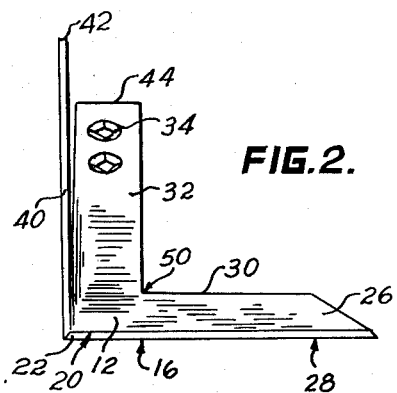
Figure 3:
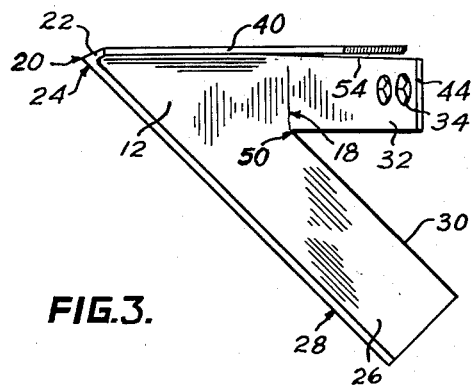
Figure 4:
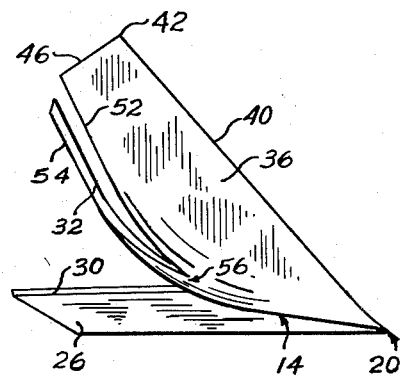
Figure 5:
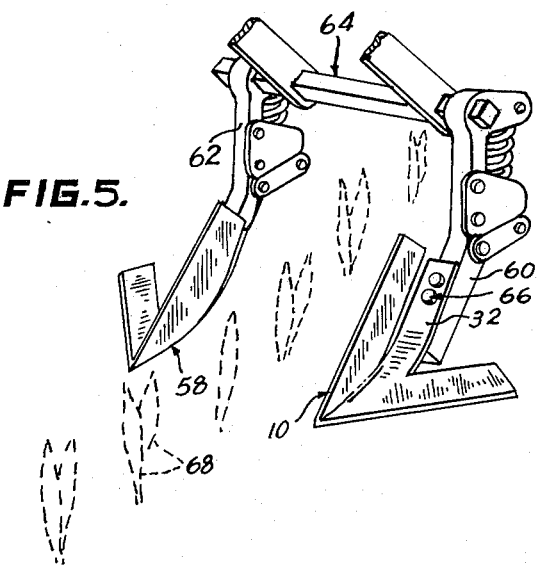
Figure 6:
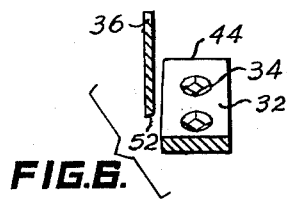

In the drawing:
FIGURE 1 is a side elevational view of a cultivator implement embodying the concepts of the present invention;
FIG. 2 is a front elevational view of the modified cultivator implement illustrated in FIG. 1;
FIG. 3 is a plan view of such implement;
FIG. 4 is a side elevational view of the opposite side of the implement as shown in FIG. 1;
FIG. 5 is a perspective view of a pair of the present modified cultivator implements showing the same mounted in operable positions on a cultivator frame, and illustrating the way in which the implements are disposed on opposite sides of a row crop in order to cultivate the soil surrounding the plants without throwing dirt on the latter; and
FIG. 6 is a vertical, cross-sectional view taken substantially on the line 6—6 of FIG. 1 and looking in the direction of the arrows.

Briefly, the present cultivator implement comprises an integral unit provided with a substantially horizontal, triangular main blade, a substantially upright shank extending upwardly from the rear portion of the main blade, an elongated, rectangular sweep integral with and extending laterally from the blade at an angle with respect to the latter and the shank, and a polygonal baffle plate joined to the main blade in a substantially upright position and extending rearwardly from the forward sharpened point of the main blade. The baffle plate merges smoothly with the main blade throughout a transversely and longitudinally arcuate intermediate zone and is provided with a lower inclined margin disposed in spaced relationship to the proximal longitudinally extending edge of the shank to thereby define a loose dirt-clearing slot between the same. The forwardmost point of the main blade as well as the leading edges of the blade and the sweep are sharpened to facilitate cultivation of the soil and cutting of weeds during advancement of the implement through the ground.

A modified cultivator implement embodying the advanced features of the instant invention is illustrated in the drawing and designated broadly by the numeral 10. Implement 10 includes a main, relatively flat blade 12 which is triangular in configuration and disposed substantially horizontally when implement 10 is mounted on a mobile vehicle in a manner to be more fully defined hereinafter.

When implement 10 is mounted in an operable position, as indicated in FIGS. 1 to 5 inclusive, the relatively straight side margin 14 of blade 12 is located above the laterally extending, sharpened leading edge 16 so that the latter slopes downwardly from margin 14 toward edge 16. By the same token, blade 12 slopes downwardly from the rear margin 18 thereof toward the substantially V-shaped point 20 defined by inwardly converging front edges 22 and 24, it being noted that edges 22 and 24 are sharpened and that edge 24 merges with and is symmetrical with leading edge 16 of blade 12.

An elongated, substantially rectangular sweep 26 is integral with main blade 12 and lies substantially in the plane of the latter. As clearly indicated in FIG. 3, the leading edge 28 of sweep 26 is sharpened and in alignment with the leading edge 16 to present a symmetrical, sharpened edge along the entire length of one side of blade 12 and sweep 26. The rear edge 30 of sweep 26 is parallel with leading edge 28, and sweep 26 is thereby disposed at an angle with respect to side margin 14 and extends rearwardly from point 20.

Inasmuch as sweep 26 lies substantially in the plane of main blade 12, rear edge 30 of sweep 26 is located above leading edge 28 so that the plane of sweep 26 slopes downwardly toward edges 16 and 28.

An elongated, rectangular shank 32 is integral with and extends upwardly from blade 12 at the rear margin 18 thereof. Shank 32 is arcuate in longitudinal configuration and provided with a pair of longitudinally disposed, spaced openings 34 adapting implement 10 to be mounted on a cultivator frame, as will be more specifically described hereinafter.

A polygonal baffle plate 36 is integrally connected to blade 12 at the side margin 14 thereof, it being noted that plate 36 merges smoothly with blade 12 throughout intermediate zone 38 that is transversely and longitudinally arcuate. Plate 36 has an elongated, upper margin 40 extending upwardly from blade 12 at an angle such as to prevent catching of weeds and other loose material on plate 36 during advancement of implement 10 through the soil. The upper end 42 of margin 40 and thereby, plate 36, is disposed substantially above the upper end 44 of shank 32, and plate 36 is provided with an angular, rearwardly projecting end margin 46 extending toward end 44 of shank 32. As clearly shown in FIG. 1, the upper end 42 of plate 36 is located forwardly of upper end 44 of shank 32. The lowermost extremity 48 of upper margin 40 of plate 36 merges with blade 12 at the terminus of front edge 22 of point 20 away from the zone of merger of edges 22 and 24.

Sweep 26 extends laterally from blade 12 and shank 32 at an angle so as to present a substantially V-shaped, loose soil clearance slot 50 between shank 32 and sweep 26.

Also, upright baffle plate 36 has an arcuate, inclined lower margin 52 substantially complementally configured with and disposed in spaced, proximal relationship to the adjacent longitudinally extending edge 54 of shank 32, lower margin 52 and edge 54 defining an arcuate, loose dirt clearance slot 56 therebetween. As most clearly shown in FIGS. 2, 3 and 6, baffle plate 36 is disposed in parallel, proximal relationship to a vertical plane through longitudinally extending edge 54 of shank 32, whereby slot 56 is located substantially vertically to facilitate passage of loose dirt through the same. Note should also be taken of the fact that slot 56 progressively increases in width as the upper end 44 of shank 32 is approached, with lower margin 52 of plate 36 merging smoothly with edge 54 of shank 32 adjacent rear margin 18 of blade 12.

As heretofore indicated, implement 10 is particularly adapted to be used in pairs with modified cultivator implement 58 being a mirror image of implement 10, as indicated in FIG. 5. Implements 10 and 58 are adapted to be mounted on respective bars 60 and 62 of a mounting frame broadly designated 64, suitably mounted on a mobile vehicle such as a tractor or the like. Inasmuch as implements 10 and 58 are secured to corresponding bars 60 and 62 by bolt means 66 passing through openings 34 in respective shanks 32 and thence into bars 60 and 62, it can be appreciated that removal and replacement of implements 10 or 58 may be quickly and easily accomplished.

Upon forward movement of the tractor and lowering of implements 10 and 58 into the ground on opposite sides of plants 68 located in a substantially straight row, V-shaped points 20 of implements 10 and 58 slide into the ground to a desired depth and thereupon, implements 10 and 58 pass smoothly through the soil beneath the surface thereof to loosen such soil, while plates 36 prevent loose dirt from being thrown onto plants 68.

In order to simplify the description of the utility of implements 10 and 58, the manner in which the same operate will be described with respect to implement 10 only, but it is to be recognized that the manner in which implement 58 functions is identical in all respects. Leading edges 16 and 28 of blade 12 and sweep 26 cut through the soil to loosen the same, and a relatively wide area of ground is displaced because of the angularity of blade 12 and sweep 26 with respect to point 20 and leading edges 16 and 28. Furthermore, leading edges 16 and 28 also sever any weeds growing between rows of plants 68, and the loose dirt flows smoothly over the upper faces of blade 12, shank 18 and sweep 26.

Loose dirt deposited against shank 32 during forward movement of implement 10 may pass either through V-shaped slot 50 defined by shank 32 and rear edge 30 of sweep 26, or through slot 56 presented by lower margin 52 of baffle plate 36 and longitudinally extending edge 54 of shank 32. It has been determined that by providing means on each side of shank 32 clearing dirt deposited thereagainst during forward movement of implement 10, the latter is advantageous for use in any type of soil whether the same be relatively dry or sandy, or of the moist, sticky type such as gumbo. It is to be pointed out, however, that baffle plate 36 operates to prevent loose dirt from being thrown onto plants 68, notwithstanding the provision of slot 56 for clearing loose dirt and this result is especially effected because of the manner in which the relative width of slot 56 progressively and uniformly increases as the uppermost end 44 of shank 32 is approached.

Because of the location of extremity 48 of margin 40 of baffle plate 36 rearwardly of the outermost end of point 20, baffle plate 36 does not interfere with forward movement of implement 10 and front edges 22 and 24 of blade 12 slice the dirt smoothly and loosen such ground prior to passage of baffle plate 36 through the same. Of equal significance is the fact that the longitudinally and transversely arcuate zone 38 between plate 36 and blade 12 serves to cause the loose dirt to flow smoothly over the upper faces of blade 12 and shank 32, thereby minimizing back-up or clogging of the dirt against shank 32, which would increase the resistance offered by the ground to forward movement of implement 10. It can be seen, however, that slots 50 and 56 clear any dirt deposited against shank 32 and therefore, maximum efficiency is obtained through utilization of implements 10 and 58.

The unitary construction of implements 10 and 58 assures that the same have maximum structural strength with respect to the size of the materials used in constructing the same and furthermore, the entire unit has a long, useful life with little or no maintenance being necessary and permitting the implement to be constructed of a single sheet of material, suitably bent into the desired configuration and tempered to the necessary hardness.

Having thus described the invention what is claimed as new and desired to be secured by Letters Patent is:

1. A cultivator implement comprising a normally substantially horizontal main blade provided with a sharpened point at the forward extremity thereof, a relatively straight side margin extending rearwardly from adjacent said point and a sharpened leading edge extending rearwardly from said point at an angle with respect to said side margin of the blade; an elongated shank integral with said main blade and extending upwardly therefrom at an obtuse angle with respect to the upper face of said main blade, said shank being provided with means thereon adapting the same to be connected to a mounting frame; a sweep integral with and extending laterally and rearwardly from said blade and having a sharpened leading edge merging symmetrically with said angular leading edge of the blade, and a trailing edge parallel with said leading edge of the sweep and spaced from said shank; and an upright baffle plate joined to and integral with the main blade at said straight side margin thereof in adjacent, substantially parallel relationship to a vertical plane through said proximal, longitudinal edge of the shank, said baffle plate extending rearwardly from the forward extremity of said side margin to a point above and adjacent the rearward and uppermost end of the shank, and of sufficient height to prevent any substantial amount of dirt to be thrown over the baffle plate onto the adjacent plants during use of the implement, said plate having a lower inclined margin disposed in slightly spaced, relatively close relationship to the proximal, longitudinally extending edge of the shank to define a relatively narrow, substantially vertically disposed slot for clearing only sufficient dirt deposited against the shank during forward advancement of the implement, to keep the shank substantially free of loose dirt without throwing of such loose dirt onto the adjacent plants.

2. A cultivator implement as set forth in claim 1 wherein said lower inclined margin of the plate is in slightly greater spaced relationship to said proximal, longitudinally extending edge of the shank adjacent the upper, rearward part of the shank than at the lower, forward portion of the same.

3. A cultivator implement as set forth in claim 1 wherein the elevation of the lower margin of the plate, said proximal, longitudinally extending edge of the shank and the slot defined therebetween progressively increase as the upper, rearward end of the shank is approached when the implement is disposed in the normal operating position thereof.

References Cited in the file of this patent
UNITED STATES PATENTS

| | | |
|---|---|---|
| 482,226 | Chaney et al. | Sept. 6, 1892 |
| 846,789 | Gilman | Mar. 12, 1907 |
| 984,146 | Lundghren et al. | Feb. 14, 1911 |
| 1,073,012 | Allen | Sept. 9, 1913 |
| 1,285,276 | McArdle | Nov. 19, 1918 |
| 1,369,954 | Beasley | Mar. 1, 1921 |
| 2,849,940 | Haynes | Sept. 2, 1958 |